(12) United States Patent
Jackson et al.

(10) Patent No.: US 8,485,229 B2
(45) Date of Patent: Jul. 16, 2013

(54) WRAPPABLE STYRENIC PIPE INSULATIONS

(75) Inventors: Peter Jackson, Toronto (CA); Adam Jackson, Trondheim (NO)

(73) Assignee: ShawCor Ltd., Toronto, Ontario (CA)

( * ) Notice: Subject to any disclaimer, the term of this patent is extended or adjusted under 35 U.S.C. 154(b) by 875 days.

(21) Appl. No.: 12/644,549

(22) Filed: Dec. 22, 2009

(65) Prior Publication Data

US 2010/0154916 A1   Jun. 24, 2010

Related U.S. Application Data

(60) Provisional application No. 61/139,650, filed on Dec. 22, 2008.

(51) Int. Cl.
*F16L 11/08* (2006.01)
*F16L 9/147* (2006.01)

(52) U.S. Cl.
USPC ............................ 138/137; 138/149; 138/134

(58) Field of Classification Search
USPC ................................... 138/137, 149, 134, 135
See application file for complete search history.

(56) References Cited

U.S. PATENT DOCUMENTS

| | | | |
|---|---|---|---|
| 2,797,731 A | 7/1957 | Carlson, Jr. | |
| 3,477,891 A | 11/1969 | Hawerkamp | |
| 3,614,967 A | 10/1971 | Royston | |
| 3,687,765 A | 8/1972 | MacLean et al. | |
| 3,731,710 A | 5/1973 | Bauer et al. | |
| 3,755,029 A | 8/1973 | Ellis et al. | |
| 3,916,953 A * | 11/1975 | Nagayoshi et al. | 138/129 |
| 3,929,166 A | 12/1975 | Westerheid | |
| 4,013,987 A * | 3/1977 | Foster | 336/206 |
| 4,038,339 A * | 7/1977 | Foster | 525/25 |
| 4,151,366 A * | 4/1979 | Betts et al. | 174/116 |
| 4,162,093 A | 7/1979 | Sigmund | |
| 4,345,042 A | 8/1982 | Kuroda et al. | |
| 4,377,186 A | 3/1983 | Genini et al. | |
| 4,380,486 A | 4/1983 | Fortsch et al. | |
| 4,384,905 A | 5/1983 | Gros | |
| 4,458,723 A | 7/1984 | Nojiri et al. | |

(Continued)

FOREIGN PATENT DOCUMENTS

| | | |
|---|---|---|
| CA | 950818 | 7/1974 |
| CA | 1216505 | 1/1987 |

(Continued)

OTHER PUBLICATIONS

Technip, Technologies and Products, Flexible Pipe, 12 pages, Apr. 2008.

*Primary Examiner* — Patrick F Brinson
(74) *Attorney, Agent, or Firm* — DeLio & Peterson, LLC; Thomas E. Ciesco

(57) ABSTRACT

A wrappable, styrenic thermal insulation product for application to flexible, armored pipe is in the form of an elongate tape of generally rectangular cross-section, optionally being provided with interlocking and/or overlapping portions so as to provide a continuous insulating layer when one or more layers of the tape are wound around the pipe. The interlocking and/or overlapping portions may be of various configurations. The tape is comprised of polystyrene or a styrene-based thermoplastic having high compressive creep resistance, high compressive strength and low thermal conductivity and may be foamed or unfoamed. A flexible, armored pipe incorporates one or more layers of the wrappable, styrenic thermal insulation product between an outer armor layer and an outer polymeric sheath.

29 Claims, 12 Drawing Sheets

U.S. PATENT DOCUMENTS

| | | | |
|---|---|---|---|
| 4,485,057 A | 11/1984 | Kristensson et al. | |
| 4,523,141 A | 6/1985 | Thomas et al. | |
| 4,549,581 A | 10/1985 | Unno et al. | |
| 4,589,275 A | 5/1986 | Thomas et al. | |
| 4,590,108 A | 5/1986 | Nippe | |
| 4,590,971 A | 5/1986 | Webster et al. | |
| 4,640,312 A | 2/1987 | Patell et al. | |
| 4,656,090 A * | 4/1987 | Markovitz | 428/364 |
| 4,657,050 A | 4/1987 | Patterson | |
| 4,676,695 A | 6/1987 | Duthweiler | |
| 4,713,271 A | 12/1987 | Searl et al. | |
| 4,778,703 A * | 10/1988 | Fontanilla | 428/40.6 |
| 4,913,588 A | 4/1990 | Vilnes | |
| 5,026,451 A | 6/1991 | Trzecieski et al. | |
| 5,160,769 A | 11/1992 | Garrett | |
| 5,238,615 A | 8/1993 | Stoor | |
| 5,597,522 A | 1/1997 | Curzon et al. | |
| 5,869,591 A | 2/1999 | McKay et al. | |
| 5,871,034 A * | 2/1999 | Sumner | 138/149 |
| 5,934,335 A | 8/1999 | Hardy | |
| 5,996,643 A | 12/1999 | Stonitsch | |
| 6,019,137 A | 2/2000 | Secher et al. | |
| 6,058,979 A | 5/2000 | Watkins | |
| 6,065,781 A | 5/2000 | Titus | |
| 6,092,557 A | 7/2000 | Sumner | |
| 6,125,608 A * | 10/2000 | Charlson | 52/847 |
| 6,142,707 A | 11/2000 | Bass et al. | |
| 6,145,546 A | 11/2000 | Hardy et al. | |
| 6,155,305 A * | 12/2000 | Sumner | 138/149 |
| 6,182,705 B1 * | 2/2001 | Sumner | 138/140 |
| 6,199,595 B1 | 3/2001 | Baker | |
| 6,235,806 B1 | 5/2001 | Ohga et al. | |
| 6,264,401 B1 | 7/2001 | Langner et al. | |
| 6,264,871 B1 | 7/2001 | Mullen et al. | |
| 6,283,215 B1 | 9/2001 | Kohler et al. | |
| 6,382,259 B1 | 5/2002 | Codling | |
| 6,505,650 B2 | 1/2003 | Bohon et al. | |
| 6,527,015 B2 | 3/2003 | Lively | |
| 6,668,866 B2 | 12/2003 | Glejbol et al. | |
| 6,736,430 B1 | 5/2004 | Meulemans et al. | |
| 6,739,803 B2 | 5/2004 | Bass et al. | |
| 6,814,146 B2 | 11/2004 | Bass et al. | |
| 6,827,110 B2 | 12/2004 | Watkins | |
| 6,843,950 B1 | 1/2005 | Blome et al. | |
| 6,887,938 B2 | 5/2005 | Atkinson | |
| 6,926,040 B1 | 8/2005 | Prescott et al. | |
| 6,978,807 B1 | 12/2005 | Keyes | |
| 7,069,955 B2 | 7/2006 | Glejbol et al. | |
| 7,101,607 B2 | 9/2006 | Mollendorf et al. | |
| 7,302,973 B2 | 12/2007 | Glejbol et al. | |
| 7,311,123 B2 | 12/2007 | Espinasse et al. | |
| 7,344,161 B2 | 3/2008 | Howard et al. | |
| 8,397,765 B2 * | 3/2013 | Jackson et al. | 138/149 |
| 2002/0083993 A1 | 7/2002 | Bohon et al. | |
| 2003/0060525 A1 | 3/2003 | Gupta | |
| 2003/0075226 A1 | 4/2003 | Codling et al. | |
| 2004/0076478 A1 | 4/2004 | Legras et al. | |
| 2004/0231743 A1 | 11/2004 | Keyes | |
| 2005/0038226 A1 | 2/2005 | Ratzsch et al. | |
| 2005/0095380 A1 | 5/2005 | Watkins et al. | |
| 2005/0214547 A1 | 9/2005 | Pasquier et al. | |
| 2006/0016617 A1 | 1/2006 | Corbishley | |
| 2006/0131027 A1 | 6/2006 | Chiesa et al. | |
| 2007/0292647 A1 * | 12/2007 | Princell | 428/36.9 |
| 2008/0079260 A1 | 4/2008 | Duncan | |
| 2008/0128043 A1 | 6/2008 | Watkins | |
| 2008/0136169 A1 | 6/2008 | Duncan | |
| 2009/0159146 A1 | 6/2009 | Jackson et al. | |

FOREIGN PATENT DOCUMENTS

| | | |
|---|---|---|
| CA | 2098792 | 12/1993 |
| CA | 1333653 | 12/1994 |
| CA | 2377767 | 1/2001 |
| CA | 2356451 | 2/2003 |
| CA | 2152150 | 9/2004 |
| CA | 2454541 | 11/2004 |
| CA | 2610202 | 12/2006 |
| CA | 2617156 | 2/2007 |
| CA | 2555756 | 2/2008 |
| EP | 0431000 B1 | 4/1994 |
| EP | 0615596 B1 | 8/1996 |
| EP | 0521582 B1 | 9/1996 |
| EP | 0704036 B1 | 1/1998 |
| EP | 0619343 B1 | 8/1998 |
| EP | 1301343 B1 | 4/2004 |
| EP | 1690662 A1 | 8/2006 |
| EP | 1649205 B1 | 4/2007 |
| GB | 1368665 | 10/1974 |
| GB | 1450012 | 9/1976 |
| GB | 2001664 A | 2/1979 |
| GB | 1547113 | 6/1979 |
| GB | 1590782 | 6/1981 |
| GB | 2215427 A | 9/1989 |
| GB | 2296749 A | 7/1996 |
| GB | 2306127 A | 4/1997 |
| GB | 2365096 A | 2/2002 |
| GB | 2401921 A | 11/2004 |
| JP | 03194289 | 8/1991 |
| WO | WO8704768 | 8/1987 |
| WO | WO8808500 | 11/1988 |
| WO | WO8911618 | 11/1989 |
| WO | WO9319927 | 10/1993 |
| WO | WO9420274 | 9/1994 |
| WO | WO9515461 | 6/1995 |
| WO | WO9533953 | 12/1995 |
| WO | WO9607846 | 3/1996 |
| WO | WO9710936 | 3/1997 |
| WO | WO9748941 | 12/1997 |
| WO | WO0073694 | 12/2000 |
| WO | WO0073695 | 12/2000 |
| WO | WO0102503 | 1/2001 |
| WO | WO0150055 | 7/2001 |
| WO | WO0159348 | 8/2001 |
| WO | WO0212776 | 2/2002 |
| WO | WO2005010894 | 2/2005 |
| WO | WO2005025830 | 3/2005 |
| WO | WO2006134077 | 12/2006 |
| WO | WO2008017147 | 2/2008 |
| WO | WO2009079784 | 7/2009 |
| WO | WO2010009559 | 1/2010 |

* cited by examiner

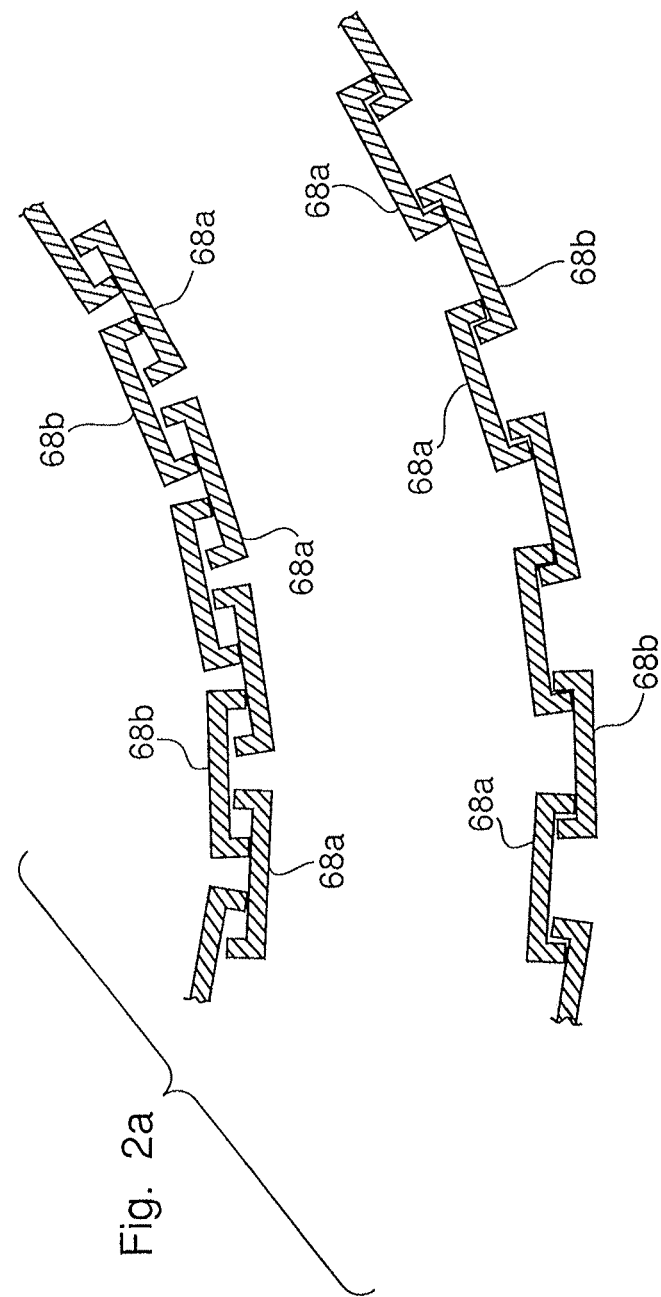

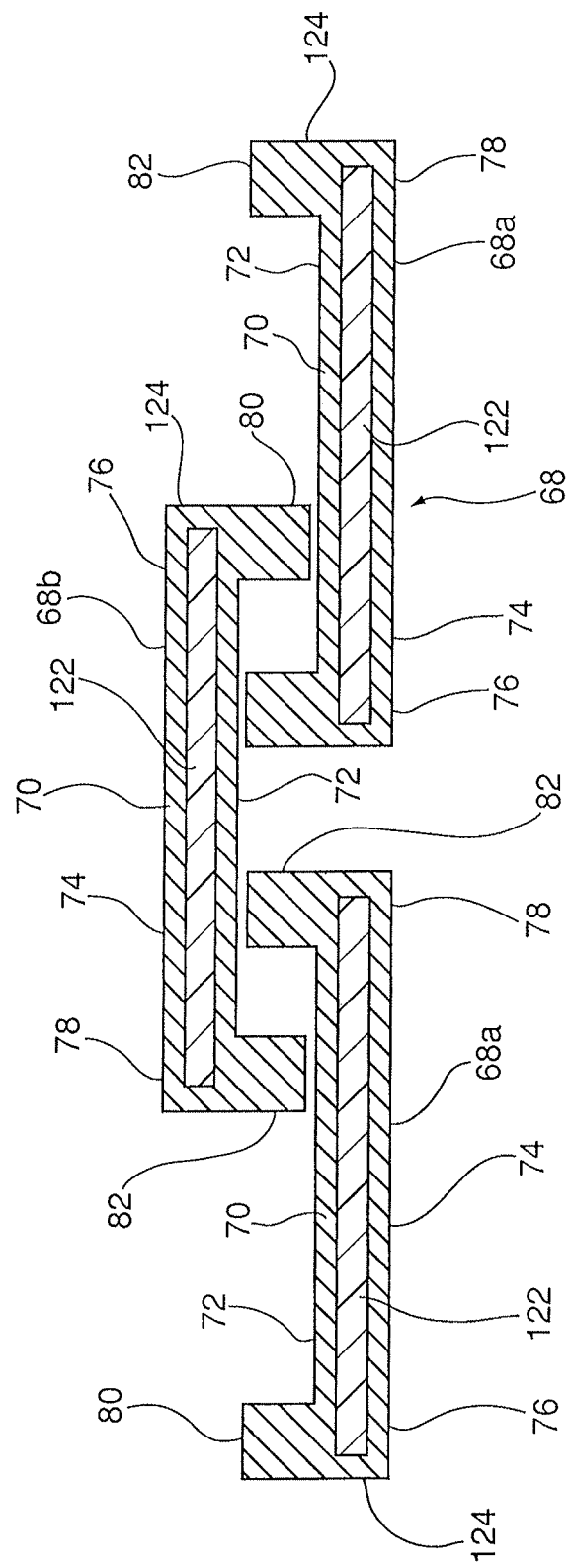

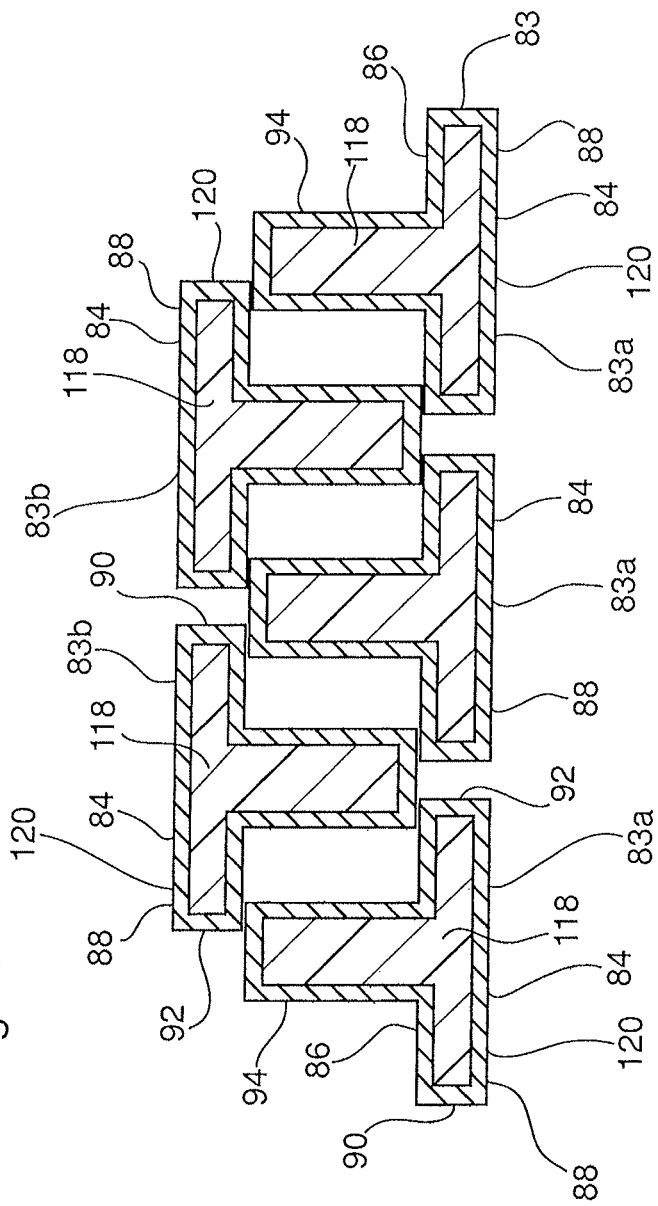

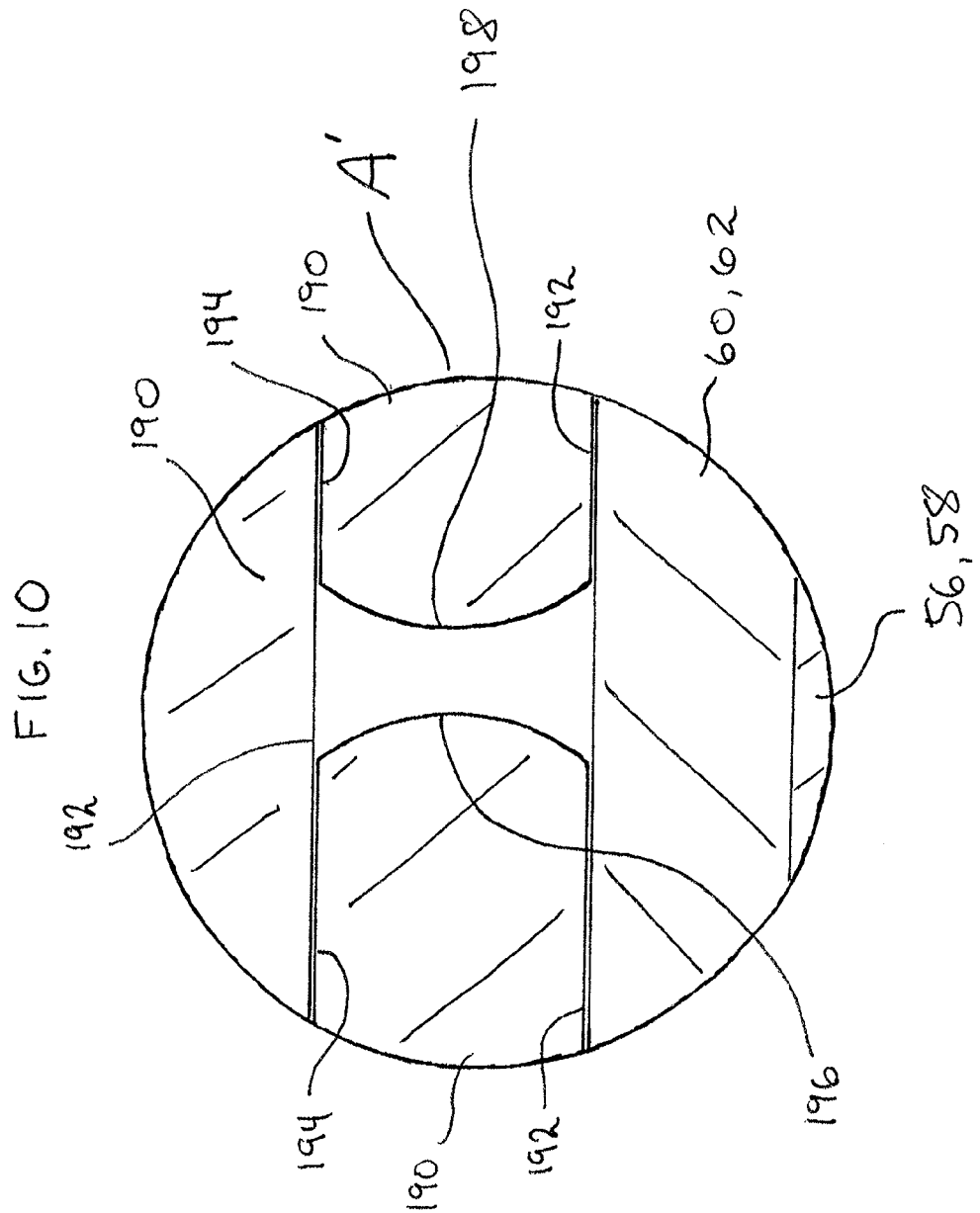

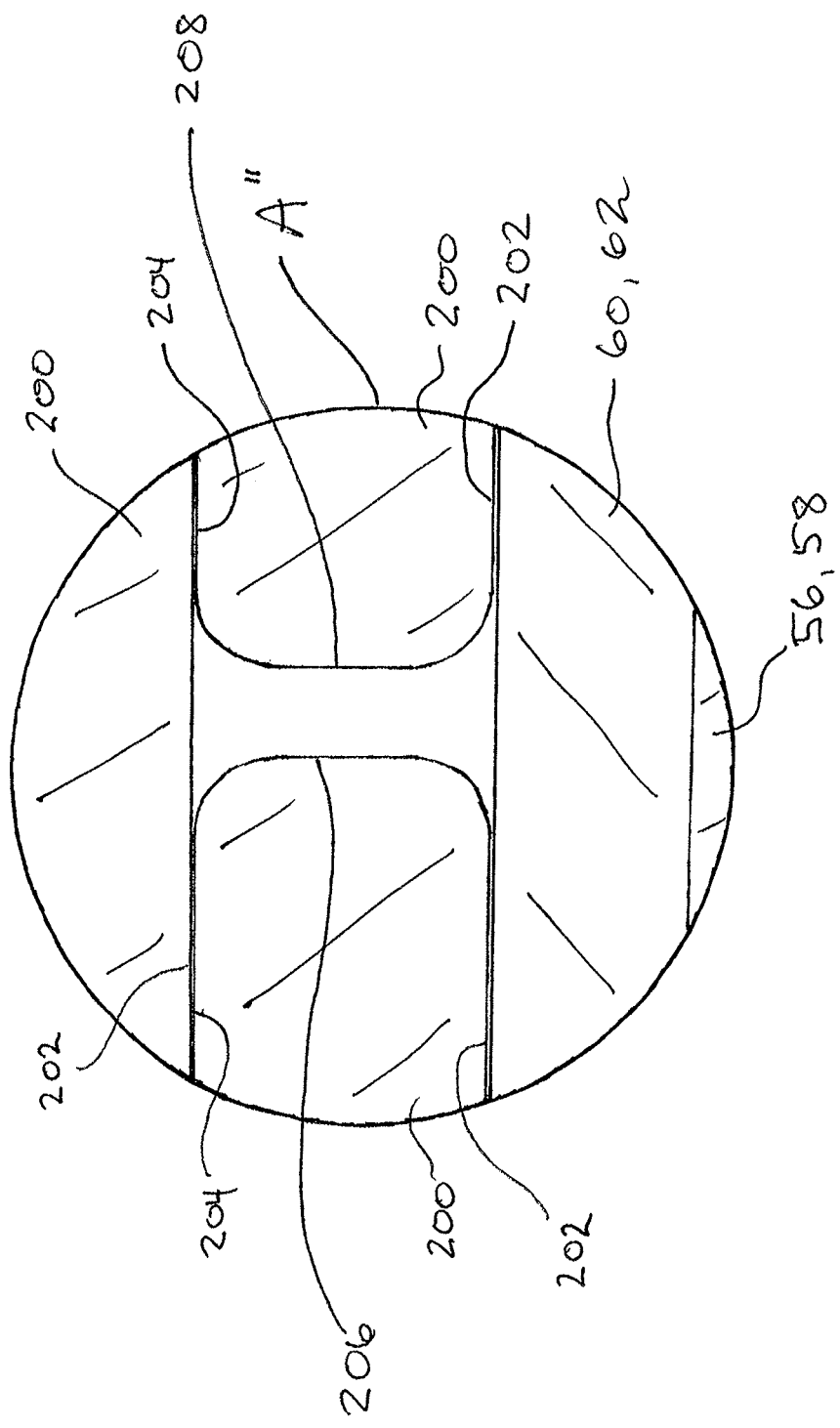

WRAPPABLE STYRENIC PIPE INSULATIONS

CROSS-REFERENCE TO RELATED APPLICATION

This application claims the benefit of U.S. Provisional Application No. 61/139,650, filed Dec. 22, 2008.

FIELD OF THE INVENTION

The present invention relates to polymeric pipe insulations based on styrenic materials for insulating and protecting flexible fluid and/or gas transport conduits. The insulations are in a form which can be wrapped around the conduit in one or more layers.

BACKGROUND OF THE INVENTION

There is increasing demand in the oil and gas industry for higher performance thermal coatings to insulate and protect off-shore transport conduits operating at high temperatures in water greater than 1,000 meters. In order to maintain the conduit at the required operating temperatures at these depths and to prevent the formation of hydrates and waxes that would compromise pumping efficiency of the fluid in the conduit, the coatings must have low thermal conductivity. Thermal conductivity is decreased through foaming of the coating to some required degree, but the coating must maintain high enough thermal stability and compressive creep resistance to withstand the operating temperatures and hydrostatic pressures acting on the coating in deep water. Without sufficient compressive strength, the insulation will be compressed in thickness, thereby increasing thermal conductivity and altering the dimensions and the thermal and hydrodynamic performance of the system. Also, it is important that the coating remain sufficiently ductile after application on the conduit to prevent cracking during handling and installation, for example during reeling of the conduit onto a lay barge and subsequent deployment therefrom.

Commonly assigned U.S. patent application Ser. No. 11/962,772 to Jackson et al. (published on Jun. 25, 2009 as US 2009/0159146 A1) describes styrenic insulation for application to the outer surface of a fluid and/or gas transport conduit, such as rigid steel pipe. The styrenic insulation layer is adapted to withstand operating temperatures and hydrostatic pressures encountered in water depths of up to about 1,000 meters. The insulation layer may be extruded onto the outer surface of the pipe by use of an annular crosshead die, or may be applied by a side-wrap technique whereby the insulation is extruded through a flat strip or sheet die and then wrapped around a pipe to form an insulation layer on the pipe.

There are also applications where it is desired to apply a layer of thermal insulation to a flexible fluid and/or gas transport conduit, for example as disclosed in U.S. Pat. No. 6,668,866 (Glejbol et al. '866) and U.S. Pat. No. 7,069,955 (Glejbol et al. '955). According to Glejbol et al. '955, one or more thermally insulating layers may be extruded between the inner liner and armour layers of a flexible pipe. According to Glejbol et al. '866, one or more layers of thermally insulating bands may be applied on top of the tensile armour layer, and are shielded from the surroundings by an outer sheath.

However, a need remains for wrappable, pre-formed thermal insulation materials offering superior insulating properties which can be applied to rigid or flexible fluid and/or gas transport conduits such as rigid or flexible oil and gas pipelines, especially for off-shore transport conduits operating at high temperatures in variable water depths up to about 1,000 meters and higher.

SUMMARY OF THE INVENTION

In one aspect, the invention provides a wrappable, styrenic thermal insulation product for application to a flexible, armoured pipe, comprising: an elongate tape comprising a flat, planar portion of generally rectangular cross-section and having a first major surface, an opposed second major surface, a pair of opposed side surfaces extending between the first and second major surfaces, a width and a thickness, wherein the width of the flat, planar portion is greater than the thickness. The tape is comprised of polystyrene or a styrene-based thermoplastic and has the following properties: triaxial compressive creep resistance of 0-10% compression after 20 years at 60 degrees C. under a load of about 5-15 MPa; uniaxial compressive strength >25 MPa; and thermal conductivity $\leq 0.170$ W/mK.

In one embodiment of the invention, the side surfaces of the tape are substantially straight, and are oriented at substantially right angles to the first and major surfaces.

In another embodiment, the side surfaces of the tape are continuously rounded between the first and second major surfaces, or the flat planar portion is provided with rounded edges at corners between the side surfaces and the first and second major surfaces, and wherein the side surfaces include straight portions extending between the rounded edges.

In yet another embodiment, the wrappable, styrenic thermal insulation product of the invention further comprises at least one overlapping portion connected to the flat, planar portion and extending therefrom, wherein the overlapping portion is adapted to engage an adjacent winding of said thermal insulation tape, after it is wound around the pipe.

In yet another embodiment, the tape has one overlapping portion extending from one of the side surfaces in a direction which is generally parallel to at least one of the first and second major surfaces, and the overlapping portion is adapted to engage a part of the flat planar portion of an adjacent winding of said thermal insulation tape, after it is wound around said pipe. Also according to this embodiment, at least one of the overlapping portion and the part of the flat planar portion which is adapted to be engaged by the overlapping portion, are of a reduced thickness relative to a maximum thickness of the flat planar portion, such that the thickness of the thermal insulation product, after it is wound around the pipe, is substantially the same as the maximum thickness of the flat planar portion of the tape.

In yet another embodiment, the tape comprises two of said overlapping portions, extending in opposite directions from the side surfaces and being generally parallel to at least one of the first and second major surfaces. A first one of the overlapping portions is adapted to engage a second one of the overlapping portions of an adjacent winding of the thermal insulation tape, after it is wound around the pipe. Also according to this embodiment, at least one of the first and second overlapping portions has a reduced thickness relative to a maximum thickness of the flat planar portion, such that the thickness of the thermal insulation product, after it is wound around the pipe, is substantially the same as the maximum thickness of the flat planar portion of the tape.

In yet another embodiment, the each of the overlapping portions has a cross-sectional shape selected from rectangular and triangular.

In yet another embodiment, each of the overlapping portion is provided with an interlocking portion which is adapted to interlock with an interlocking portion in an adjacent winding of said thermal insulation tape, after it is wound around said pipe.

In yet another embodiment, the wrappable, styrenic thermal insulation product of the invention further comprises at least one interlocking portion connected to the flat, planar portion and protruding at an angle to the first and second major surfaces, wherein the at least one interlocking portion is adapted to interlock with an interlocking portion in an adjacent winding of the thermal insulation tape, after it is wound around the pipe.

In yet another embodiment, each of the interlocking portions protrudes from either the first or second major surface of the flat, planar portion.

In yet another embodiment, the elongate band has two of the interlocking portions, both of which protrude from the first major surface of the flat, planar portion.

In yet another embodiment, the elongate tape defines a longitudinal axis, wherein the elongate tape has a pair of edge portions extending along the longitudinal axis, and wherein each of the interlocking portions is located in one of the edge portions, or the elongate tape has one of said interlocking portions located approximately midway between the edge portions.

In yet another embodiment, each of the interlocking portions protrudes from either the first or second surface of the flat, planar portion at an angle of about 90 degrees.

In yet another embodiment, the interlocking portions all have substantially the same height.

In yet another embodiment, the elongate tape has a pair of the interlocking portions and is U-shaped in transverse cross-section.

In yet another embodiment, the elongate tape has two of the interlocking portions, one of which protrudes from the first major surface of the flat planar portion, and the other of which protrudes from the second major surface of the flat planar portion.

In yet another embodiment, the elongate tape has a pair of the interlocking portions and is S-shaped or Z-shaped in transverse cross-section, or has one interlocking portion which extends from the flat planar portion at an angle of about 90 degrees such that the elongate tape is T-shaped in transverse cross-section.

In yet another embodiment, the wrappable, styrenic thermal insulation product is comprised of polystyrene or styrene-based thermoplastic selected from one or more members of the group comprising: polystyrene homopolymer, polystyrene copolymer, high-impact polystyrene and modified polystyrene. The modified polystyrene may comprises polystyrene which is blended, grafted or copolymerized with butadiene, polybutadiene, polyethylene, polypropylene, polybutene-1, polyphenylene oxide, styrene-butadiene, styrene-butadiene-styrene, styrene-isoprene-styrene, styrene-ethylene/butylene-styrene, ethylene-propylene, acrylonitrile, butadiene-acrylonitrile, α-methyl styrene, acrylic ester, methyl methacrylate, polycarbonate, or polyphenylene ether.

In yet another embodiment, the polystyrene or styrene-based thermoplastic is unfoamed, having a degree of foaming of 0 percent. Alternatively, the polystyrene or styrene-based thermoplastic is foamed and contain gas bubbles and/or hollow micro-spheres, having a degree of foaming greater than 0 percent and up to 50 percent, for example from about 5 to about 50 percent, or from about 10 to about 30 percent.

In yet another embodiment, the elongate tape has a core layer which is foamed and a surface layer surrounding the core layer, wherein the surface layer is unfoamed.

In yet another embodiment, the polystyrene or styrene-based thermoplastic has a density in the range from about 700 to about 1050 $kg/m^3$, or from about 850 to about 1030 $kg/m^3$.

In another aspect, the invention provides a flexible, armoured pipe comprising a flexible, cylindrical metal carcass surrounded by at least one layer of flexible metal armour; and the pipe further comprises a layer of thermal insulation surrounding the armour. The layer of thermal insulation is comprised of one or more layers of the wrappable, styrenic thermal insulation product of the invention, and each layer of the tape is comprised of a plurality of windings arranged adjacent to one another. The thermal insulation tape is comprised of a thermoplastic material, and comprises a flat, planar portion which is substantially parallel to an axis defined by the carcass and the armour.

In another embodiment, the flexible, armoured pipe further comprises an external, polymeric sheath provided over the armour, and wherein the at least one layer of thermal insulation is located between the armour and the external, polymeric sheath.

BRIEF DESCRIPTION OF THE DRAWINGS

The invention will now be described, by way of example only, with reference to the accompanying drawings in which:

FIG. 2a is a cross-sectional view showing the flexing of the thermal insulation layer of FIG. 2 during bending of the flexible pipe.

FIG. 3 is a cross-sectional perspective view showing another embodiment of a thermal insulation layer for an insulated flexible pipe.

FIG. 4 is a cross-sectional perspective view showing yet another embodiment of a thermal insulation layer for an insulated flexible pipe.

FIGS. 6 to 11 are cross-sectional views of thermal insulation tapes according to other embodiments of the invention.

DETAILED DESCRIPTION OF PREFERRED EMBODIMENTS

Figure 1:
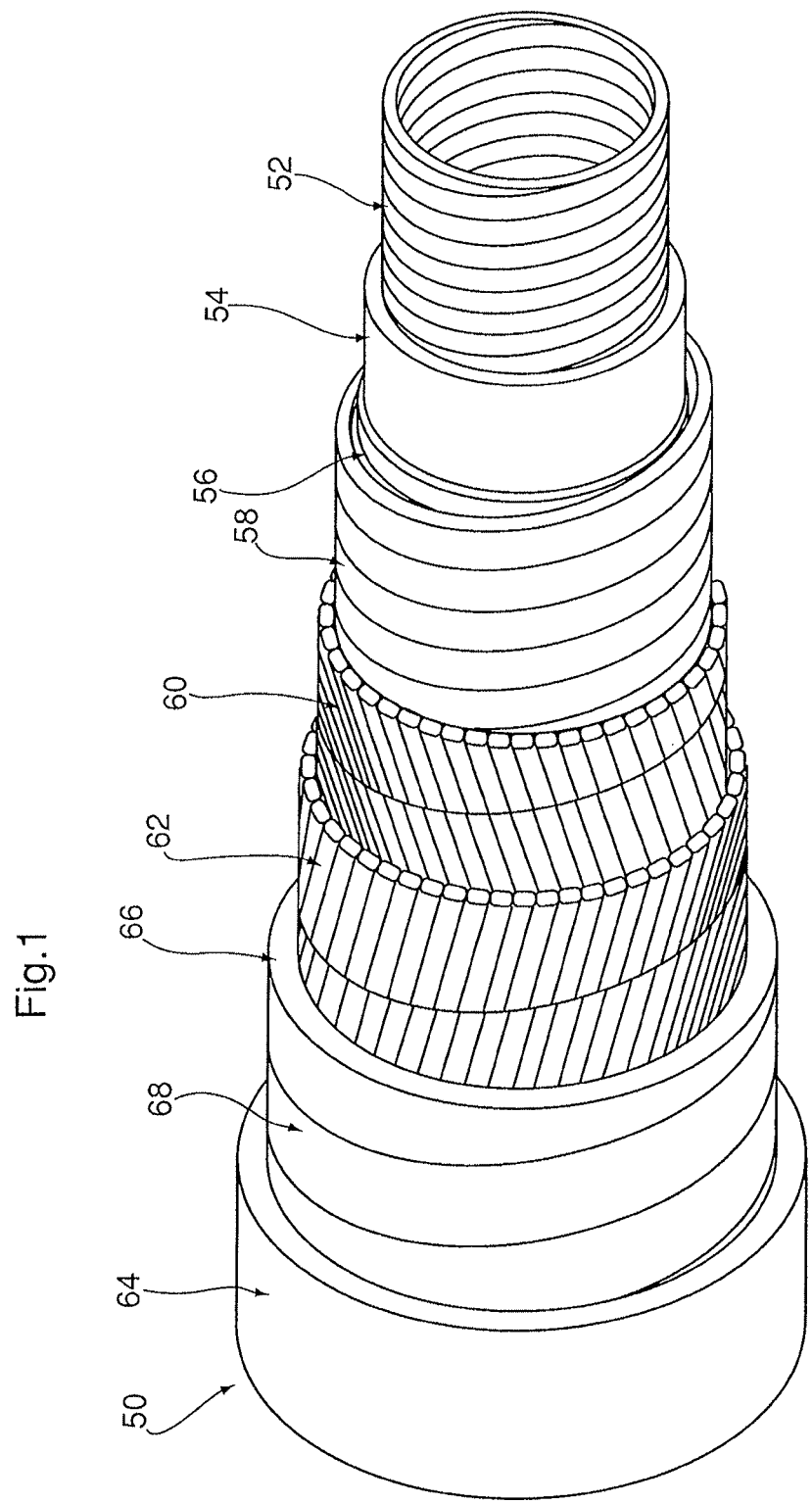
FIG. 1 is a perspective view, partly in cross-section, showing a length of insulated flexible pipe according to the invention.

The invention relates to a styrenic thermal insulation product in the form of a tape or band which is adapted to be wound around a rigid or flexible pipe to form one or more thermal insulation layers in accordance with the invention, as well as insulated fluid and/or gas transport conduits incorporating such thermal insulation layers.

The term "fluid and/or gas transport conduits", and similar terms as used herein, are intended to include such oil and gas pipelines and related components, including flowlines, risers, jumpers, spools, manifolds and ancillary equipment.

The term "tape" or "band" as used herein refers to a flexible strip of material having a longitudinal dimension or length which is substantially greater than its transverse dimension or width, and which is generally flat with a thickness or height which is less than its transverse dimension. These embodiments of the invention are now described below with reference to the drawings. The thickness of the thermal insulation tapes described herein is variable, and may be in the range from about 5 to about 10 mm.

The pre-formed thermal insulation tape may preferably be supplied in the form of a roll which can be unwound during application to the pipe. The tape may be wound around the pipe in a helical pattern, with individual windings of the tape either being spaced apart or overlapping each other at their edges so as to provide a continuous layer of insulating material. The tape of insulating material may have a rectangular cross section and may comprise one or more layers of thermal insulation and/or other optional layers. These layers may be separately formed and then adhered together, or they may be co-extruded. The thermal insulation layers may be solid (unfoamed) or foamed. For example, the tape may include an inner layer comprised of a foamed thermal insulation material and an outer, abrasion-resistant top coat which may be comprised of an unfoamed layer of polymer which is the same as or different from the polymer making up the foamed layer. In another embodiment, the tape of thermal insulating material may have a core layer which is foamed, with the core layer being surrounded by an outer surface layer of unfoamed polymer material.

When applied to a rigid pipe, it may be preferred to adhere the individual windings of thermal insulation material to each other and/or to the pipe so as to form a continuous, bonded insulation layer. In this regard, it may be preferred to fuse the individual windings of insulating material to each other and to the pipe by application of heat. It may also be preferred to provide one surface of the band or tape of material with a layer of adhesive, for example by co-extrusion. The adhesive layer would be applied to the face of the insulating band or tape which comes into contact with the pipe surface, to adhere the tape or band to the pipe and also join together the overlapping edges of adjacent windings of insulating material.

The tape of thermal insulating material may also be applied to fluid and/or gas transport conduits comprised of flexible pipes. Typically, the insulating tape will be applied to a flexible pipe as an unbonded insulation layer, i.e. wherein the individual windings are not adhered or bonded to either the surface of the pipe or to each other.

Fluid and/or gas transport conduits comprised of flexible pipes may be used in petroleum production installations for the transport of fluids and gases through varying depths of water, as in risers which carry hot fluids such as hydrocarbons from depths in excess of 1,000 meters to the surface. Such flexible pipes may be of the "rough-bore" type, having an inner layer or "carcass" comprised of a helical winding of interlocking strips of metal. Alternatively, the flexible pipe may be of the "smooth-bore" type, having an inner polymeric liner. The insulating tapes according to the present invention are applicable to a wide variety of flexible pipe structures, including the rough bore and smooth bore varieties described above. Several embodiments of the invention will now be described below in connection with the application of a thermal insulation layer, in the form of a tape, to a typical flexible pipe structure.

FIG. 1 illustrates a typical flexible pipe structure 50 of the "rough bore" type having an inner carcass 52 comprised of a helically wound metal strip which forms an inner, permeable layer which is flexible and has high mechanical strength. Wrapped around the carcass 52 is an inner liner 54 formed from an extruded layer of impermeable, heat resistant polymeric material which forms an impervious barrier between the exterior and interior of the pipe 50. Wrapped around the inner liner 54 are one or more layers of flexible pressure armour 56, 58, which are in the form of interlocking metal strips and are helically wound around the inner liner 54 at a relatively large angle to the longitudinal direction. The pressure armour layers 56, 58 absorb radial forces arising as a result of pressure from inside or outside the pipe 50.

Wrapped around the outside of the pressure armour layers 56, 58 are one or more tensile armour layers 60 and 62 which are helically wound around the pipe at a relatively small angle to the longitudinal direction to absorb forces exerted along the longitudinal axis of the pipe 50. The outermost layer of pipe 50 comprises an outer sheath 64 which may preferably be comprised of an extruded layer of abrasion-resistant polymeric material.

As shown in FIG. 1, between the layers of tensile armour 60, 62 and the outer sheath 64 there is provided at least one thermal insulation layer 66. The thermal insulation layer 66 may comprise at least one length of thermal insulation tape 68 which is helically wound around the entire length of pipe 50 in one or more layers so as to provide the pipe 50 with a continuous layer of thermal insulation. The number of layers of thermal insulation tape 68 making up thermal insulation layer 66 depends on a number of factors, including geometrical (pipe size) and thermal (required loss coefficient) considerations, as well as the thickness of the insulation tape 68. Generally speaking, where the thickness of the insulation tape is from 5-10 mm, about 5-10 layers of insulation tape 68 may be applied to the pipe. The individual windings of the tape 68 may be spaced apart or may overlap one another, as further described below. It will be appreciated that the pipe 50 may be provided with two or more consecutively applied thermal insulation layers 66.

In the pipe structure 50 described above, flexibility is provided by the wound or articulated structure of the carcass 52 and the armour layers 56, 58, 60, 62. Likewise, it is preferred that the thermal insulation layer 66 also has an articulated structure so as not to impair flexibility of the pipe 50. This articulated structure may be provided by forming the thermal insulation tape with a cross-sectional shape which permits a limited amount of relative movement (also referred to herein as "slippage") in the longitudinal direction while maintaining overlap between adjacent windings of the tape. A wide variety of cross-sectional shapes are possible, including those specifically described below.

In some embodiments of the invention, the thermal insulation tape is provided with a cross-section which permits interlocking or overlapping of the windings and/or layers of tape, when the tape is applied as one or more layers. For example, the tape may include a flat, planar portion which is adapted to lie flat on the surface of the pipe 50 or another layer of thermal insulation tape, and an interlocking or overlapping portion which is connected to the flat, planar portion and extends therefrom. The flat planar portions of the tape are preferably not adhered to one another or to the pipe 50, so as to permit slippage of the individual windings of the tape relative to the pipe, in a direction parallel to the longitudinal axis of the pipe.

The insulation tape may be provided with one or more interlocking or overlapping portions, depending on its cross-sectional shape. The interlocking or overlapping portions of adjacent windings of the tape are adapted to nest with one another and to permit a limited range of longitudinal slippage of the windings, while maintaining overlap between the edges of adjacent windings.

Figure 2:
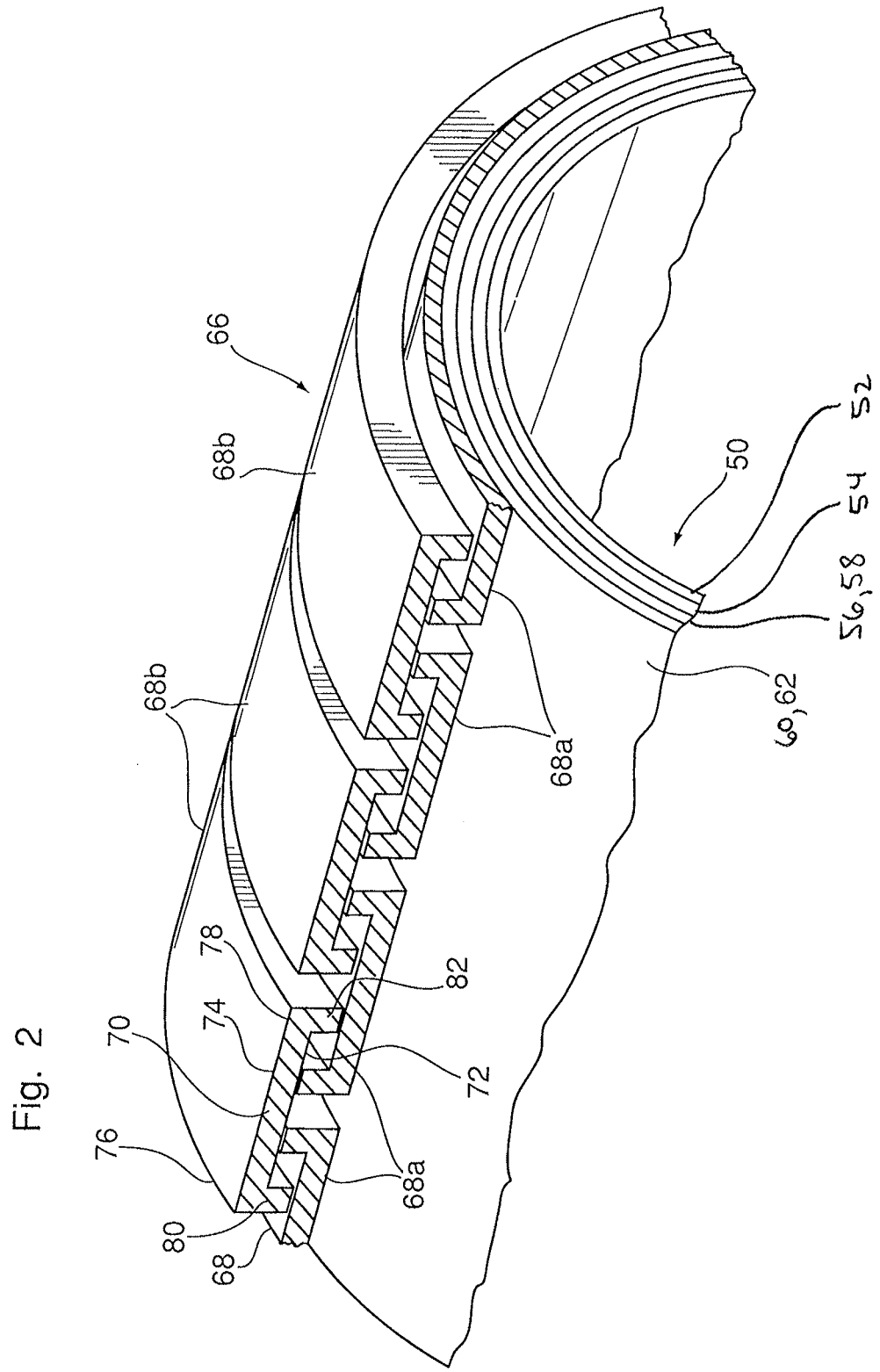
FIG. 2 is a cross-sectional perspective view showing the thermal insulation layer of the insulated flexible pipe of FIG. 1.

In one embodiment of the invention illustrated in FIGS. 2, 2a and 3, the thermal insulation tape 68 comprises an interlocking U-shape or C-shape, having a flat, planar portion 70 with a first major surface 72 and an opposed second major surface 74, and having transversely spaced edge portions 76 and 78. The first major surface 72 is provided with a pair of locking portions in the form of legs 80 and 82 which are located in edge portions 76, 78 of the tape 68 and extend continuously along its length. The legs 80, 82 are of the same height and extend at an angle of about 90° from the flat planar portion 70 of tape 68, although the angle may vary from about 45-90°.

In the embodiment of FIGS. 2, 2a and 3, the thermal insulation layer 66 is made up of two individual lengths or layers of tape, labelled 68a and 68b. Length 68a forms an inner portion of insulation layer 66 and is wound around pipe 50 with its first surface 72 and legs 80, 82 facing away from the pipe 50. Length 68b forms an outer portion of insulation layer 66 and is wound around pipe 50 with its first surface 72 and legs 80, 82, facing toward the pipe 50. Thus, the legs 80, 82 of the respective lengths 68a, 68b of tape 68 nest with one another such that each leg 80 or 82 of a winding of length 68a is nested between two legs 80, 82 of an adjacent winding of length 68b, and vice versa. Each leg 80 or 82 of each winding of tape 68 also engages the first surface 72 of an adjacent winding of tape 68. It will be appreciated that the appearance of pipe 50 in FIG. 2 is highly simplified, and that the pipe 50 is shown without the outer sheath 64 over the insulation layer 66. Also, the relative thicknesses of the various layers of pipe 50 in FIG. 2 are not necessarily shown to scale.

As shown in FIG. 2a, the edge portions 76, 78 of the flat planar portions 70 overlap one another so that the two layers 68a, 68b of tape will maintain a continuous layer of insulation along the length of pipe 50. The legs 80, 82 are positioned so as to act as stops which limit the maximum amounts of longitudinal slippage of the flat planar portions 70 during bending of pipe 50.

FIG. 4 illustrates an interlocking thermal insulation tape 83 having a T-shaped cross section, including a flat planar portion 84 with a first major surface 86, a second major surface 88 and transversely spaced edge portions 90 and 92. Extending from the first surface 86 at an angle of about 90° is a locking portion in the form of leg 94, the leg 94 being positioned approximately midway between the edge portions 90, 92 so as to form the T-shape. It is not required that the leg 94 extends at an angle of 90° from the flat planar portion 84, but rather the angle may be in the range from 45-90°.

As with the embodiment shown in FIGS. 2, 2a and 3, the thermal insulation layer 66 in this embodiment is made up of two individual lengths or layers of the T-shaped tape 83, a first length 83a which is wrapped around pipe 50 with its first surface 86 and leg 94 facing away from the pipe 50 and a second length 83b which has its first surface 86 and leg 94 facing inwardly toward the pipe 50. As shown in FIG. 4, the legs 94 of lengths 83a and 83b nest with one another to limit slippage of the flat planar portions 84, with each leg 94 of each winding of length 83a nested between the legs 94 of two adjacent windings of length 83b, and vice versa. Also, the leg 94 of each winding of tape 83 engages the edge portions of two adjacent windings of tape 83.

Figure 5:
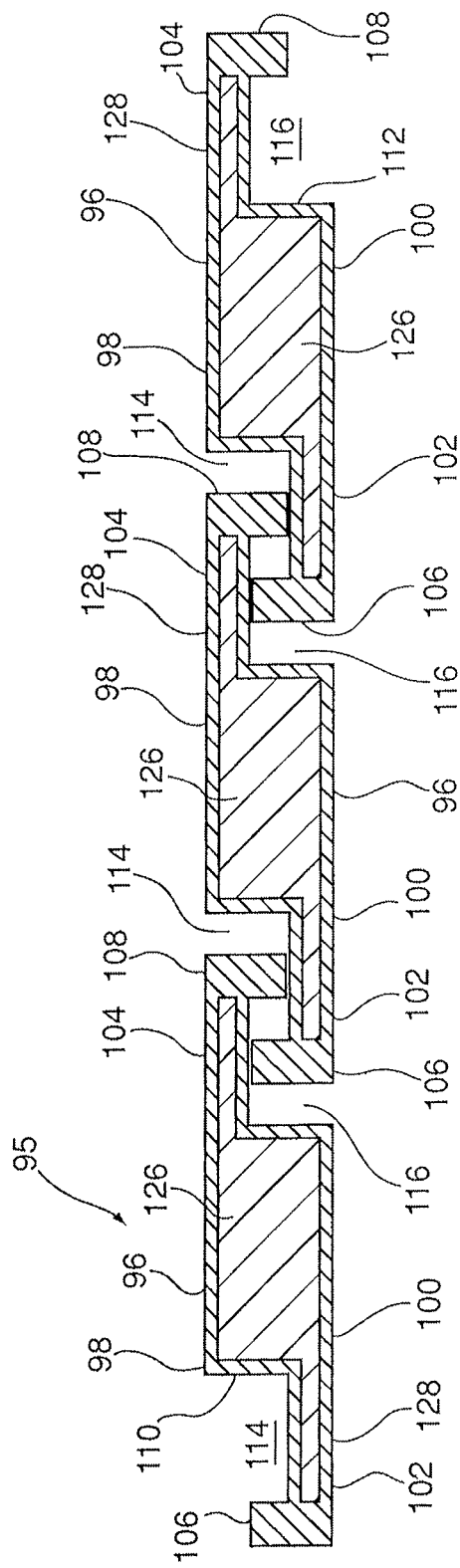
FIG. 5 is a cross-sectional perspective view showing yet another embodiment of a thermal insulation layer for an insulated flexible pipe.

Yet another interlocking cross-sectional shape is illustrated in FIG. 5, illustrating a thermal insulation tape 95 having a Z-shaped or S-shaped cross section. Tape 95 includes a flat planar portion 96 having a first major surface 98 and a second major surface 100 and edge portions 102 and 104. Tape 95 is also provided with a pair of legs 106, 108, each of which extends at an angle of about 90° from opposite surfaces of the tape 95. In particular, leg 106 extends from the first major surface 98 and leg 108 extends from the second major surface 100, with leg 106 being located in edge portion 102 and leg 108 extending in the opposite direction from edge portion 104. It is not required that the legs 106, 108 extend at an angle of 90° from the flat planar portion 96, but rather the angle may be in the range from 45-90°.

Since the legs 106, 108 extend from opposite surfaces 98, 100 of the flat planar portion 96, the thermal insulation layer 66 can be formed from a single length of tape 95. In order to permit interlocking of adjacent windings of tape 95, the first major surface 98 may be provided with a shoulder 110 which reduces the thickness of the flat planar portion 96 of tape 95 proximal to the leg 106 and the second major surface 100 is similarly provided with a shoulder 112 which reduces the thickness of the flat planar portion 96 of tape 95 proximal to the leg 108. Thus, a longitudinally-extending groove 114 is formed between shoulder 110 and leg 106 which houses the leg 108 of an adjacent winding of tape 95, and similarly a longitudinally-extending groove 116 is formed between shoulder 112 and leg 108 which houses the leg 106 of an adjacent winding of tape 95. The grooves 114, 116 each have a transverse width sufficient to permit limited relative slippage of adjacent windings of tape 95 while maintaining overlap between the edge portions 102, 104 of adjacent windings of tape 95.

As mentioned above, the insulating tapes according to the invention may be of a single or multi-layer construction. In the embodiments described above with reference to FIGS. 1 to 5 it is desired to permit slippage between adjacent windings of tape and therefore these insulating tapes are preferably not provided with adhesive layers on their outer surfaces. It may, however, be desirable to provide any of the insulation tapes described herein with layers of foamed and unfoamed polymeric materials so as to enhance their insulating and mechanical properties. For example, the insulation tapes described herein may be provided with an inner core layer comprised of a foamed polymeric material in order to provide the desired thermal insulating properties, with an outer unfoamed layer of polymeric material surrounding the core layer and providing the desired mechanical properties. It will be appreciated that the foamed and unfoamed layers may be formed from the same or different polymeric materials and may preferably be formed by co-extrusion.

With reference to the drawings, FIGS. 3-5 illustrate examples of insulation tapes having a central core layer of foamed polymeric material and a surrounding surface layer of unfoamed polymeric material. In the T-shaped thermal insulation tape 83 shown in FIG. 4 the leg 94 may be relatively thick so the foamed core layer 118 extends throughout the flat planar portion 84 and the leg 94, with a surface layer 120 of unfoamed polymeric material being provided over the core layer 118. In the embodiments of FIGS. 3 and 5 the legs may be relatively thin and therefore, to ensure that the legs have sufficient mechanical strength, the foamed core layer may be present only in the flat planar portion of the tape 68 or 95. With particular reference to FIG. 3, the flat planar portion 70 of tape 68 is provided with a core layer 122 of foamed polymeric material whereas the surface layer 124 of the flat planar portion 70 and the legs 80, 82 are formed entirely from unfoamed polymeric material. Similarly, with reference to FIG. 5, the flat planar portion 96 of tape 95 is provided with a core layer 126 of foamed polymeric material, while the surface layer 128 of the flat planar portion 96 and the legs 106, 108 are formed entirely from unfoamed polymeric material.

Figure 6:
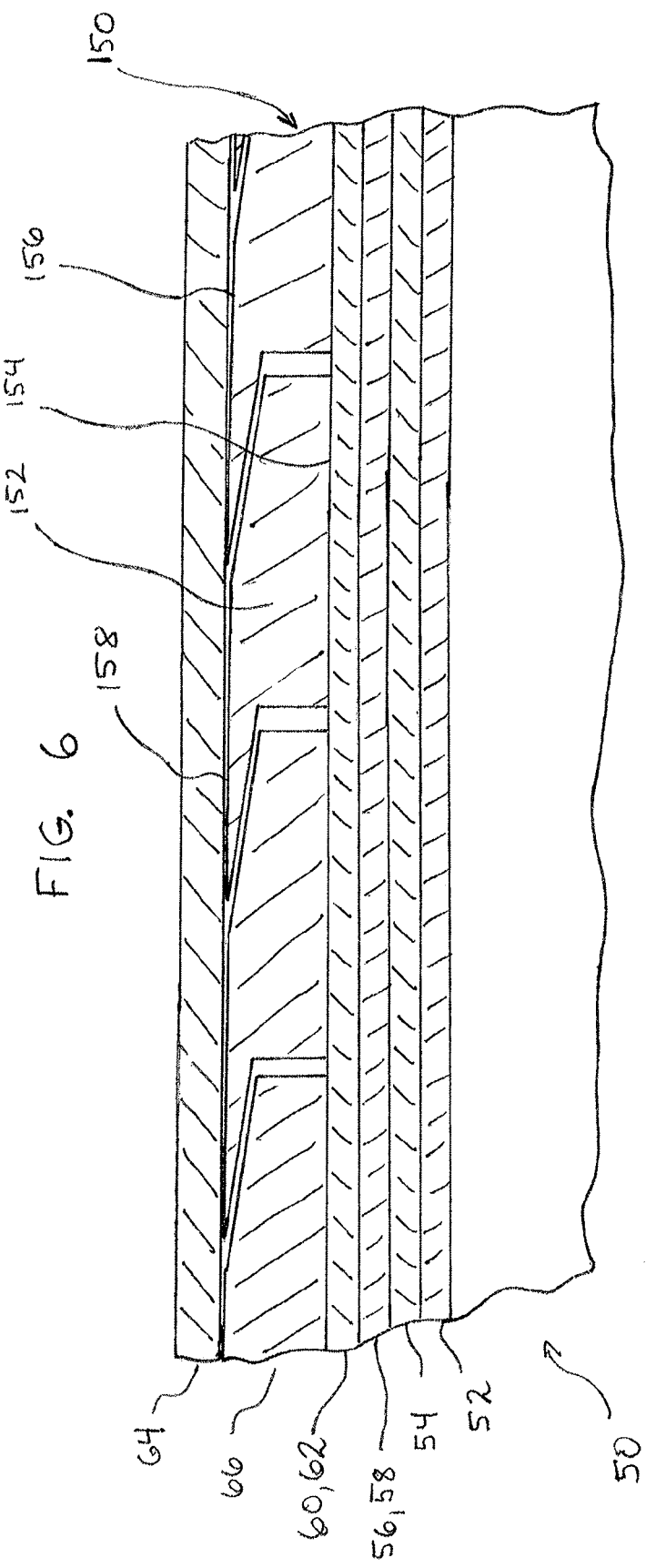
Figure 7:
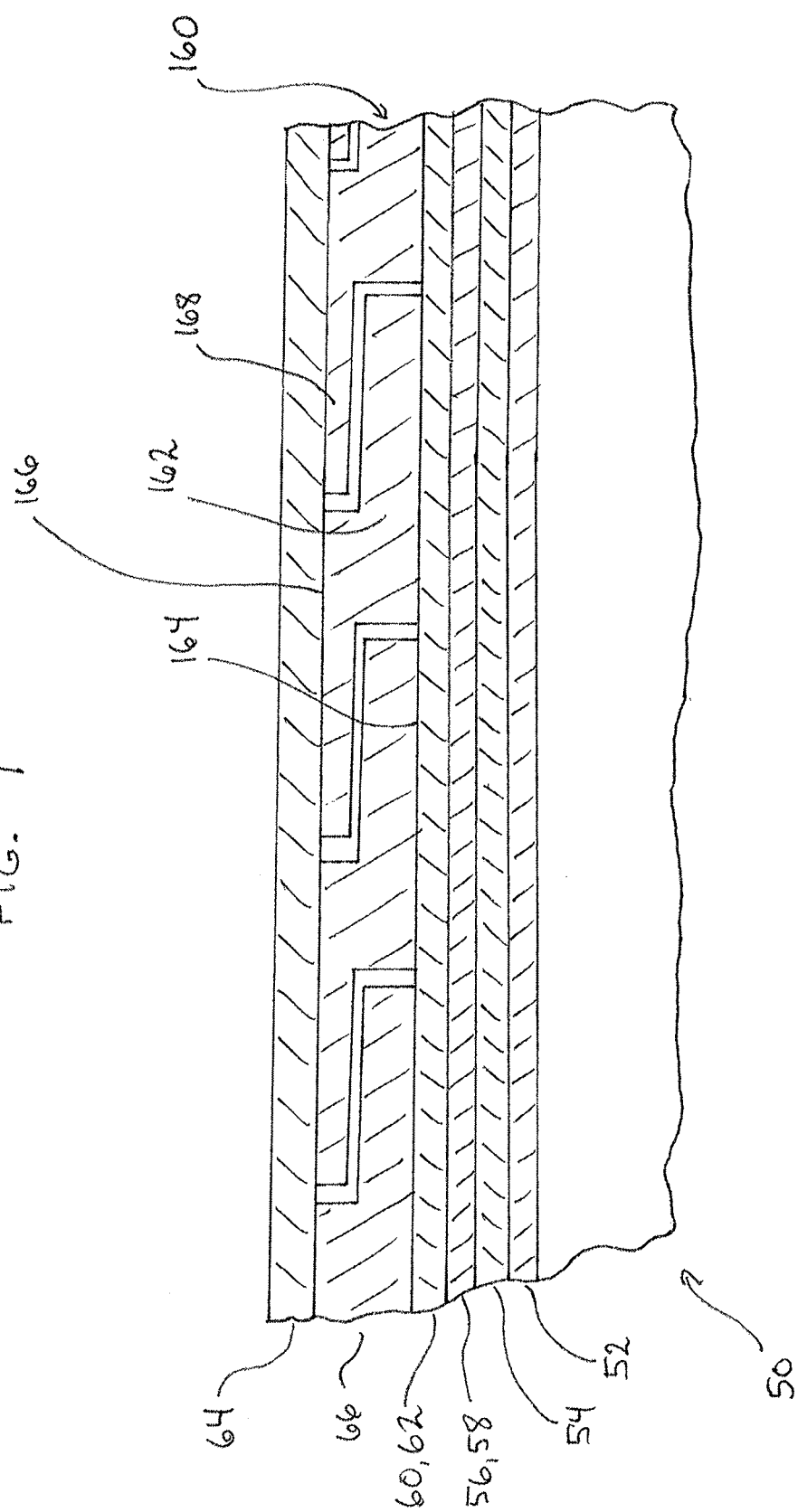
Figure 8:
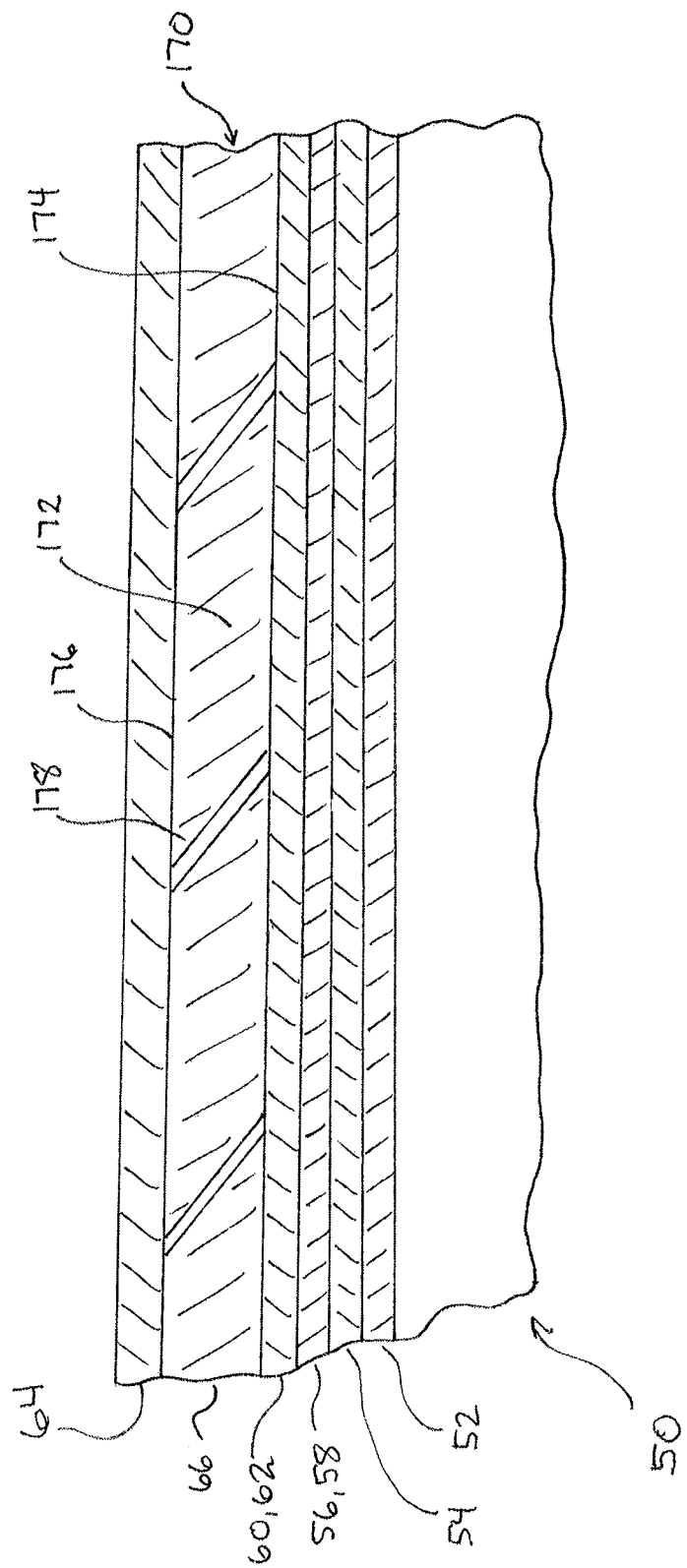

FIGS. 6 to 8 illustrate thermal insulation tape profiles in which the tape is provided with overlapping portions which do not interlock in the manner described above with reference to FIGS. 2 to 5. The tapes according to FIGS. 6 to 8 are nevertheless constructed so as to maintain adequate overlap between the edges of adjacent windings during limited longitudinal slippage of the windings caused by bending of the pipe 50. As in FIG. 2, the appearance of the pipe in FIGS. 6 to 8 is greatly oversimplified by eliminating details of construction from all layers but the insulation layer 66. Also, the relative thicknesses of the various layers of pipe 50 in FIGS. 6 to 8 are not necessarily shown to scale.

FIG. 6 illustrates a pipe 50 having a thermal insulation layer 66 located between the tensile armour layers 60, 62 and the outer sheath 64. The thermal insulation layer is comprised of a single layer 66 of a thermal insulation tape 150 having a flat planar portion 152 of approximately rectangular cross section, located between the having a first major surface 154 and a second major surface 156, with the first major surface 154 facing inwardly toward the centre of the pipe 50 and the second major surface 156 facing outwardly toward the outer sheath 64. Projecting from one edge of the flat planar portion 152 is a leg 158 which overlaps the second major surface 156 of flat planar portion 152 of an adjacent winding of tape 150, the leg 158 having sufficient width so as to maintain overlap when the separation between adjacent windings increases during bending of the pipe. In order that the layer of insulation is of approximately constant thickness and to allow limited articulation of the insulation tape, the leg 158 and the second major surface 156 of flat planar portion 152 may have complementary shapes. In the embodiment shown in FIG. 6, the leg 158 is wedge-shaped and decreases in thickness with increasing distance from the flat planar portion 152, and the second major surface 156 is sloped across at least a part of its width so as to engage the wedge-shaped leg 158.

FIG. 7 illustrates a pipe 50 having a thermal insulation layer 66 located between the tensile armour layers 60, 62 and the outer sheath 64. The thermal insulation layer 66 is comprised of a single layer of a thermal insulation tape 160 which is similar to tape 150 of FIG. 6, having a flat planar portion 162 of approximately rectangular cross section, having a first major surface 164 and a second major surface 166, with the first major surface 164 facing inwardly toward the centre of the pipe 50 and the second major surface 166 facing outwardly toward the outer sheath 64. Projecting from one edge of the flat planar portion 162 is a leg 168 which overlaps the second major surface 166 of flat planar portion 162 of an adjacent winding of tape 160, the leg 168 having sufficient width so as to maintain overlap when the separation between adjacent windings increases during bending of the pipe. As in the embodiment of FIG. 6, the leg 168 and the second major surface 166 of flat planar portion 162 have complementary shapes, with the leg 168 having a rectangular cross-section and the second major surface 166 being notched or rebated to receive the leg 168.

FIG. 8 illustrates yet another example of a pipe 50 having a thermal insulation layer 66 located between the tensile armour layers 60, 62 and the outer sheath 64. The thermal insulation layer 66 is comprised of an overlapping thermal insulation tape 170, which is a variant of the tape 150 shown in FIG. 6. Tape 170 has a flat planar portion 172 of approximately rectangular cross section, having a first major surface 174 and a second major surface 176, with the first major surface 174 facing inwardly toward the centre of the pipe 50 and the second major surface 176 facing outwardly toward the outer sheath 64. Projecting from one edge of the flat planar portion 172 is a leg 178 which overlaps the second major surface 176 of flat planar portion 172 of an adjacent winding of tape 170, the leg 178 having sufficient width so as to maintain overlap when the separation between adjacent windings increases during bending of the pipe. As in the embodiment of FIG. 6, the leg 178 and the second major surface 176 of flat planar portion 172 have complementary shapes, with the leg 178 having a triangular cross-section and the second major surface 176 being chamfered along one edge to engage the triangular leg 178.

Although the overlapping insulation tapes illustrated in FIGS. 6 to 8 are adapted to maintain a continuous layer of insulation when applied as a single layer, it will be appreciated that a flexible pipe can be provided with two or more layers of any of these tapes, depending at least partly on the desired thickness of insulation layer 66 and on the thickness of the thermal insulation tape 150, 160, 170. Where multiple layers of these tapes are applied to a pipe, adjacent layers should be applied in a staggered manner, so that the gaps between individual windings in one layer will be aligned with the flat planar portions of the tape in adjacent layer(s). For example, adjacent layers of tape may be staggered by about 50 percent.

Figure 9:
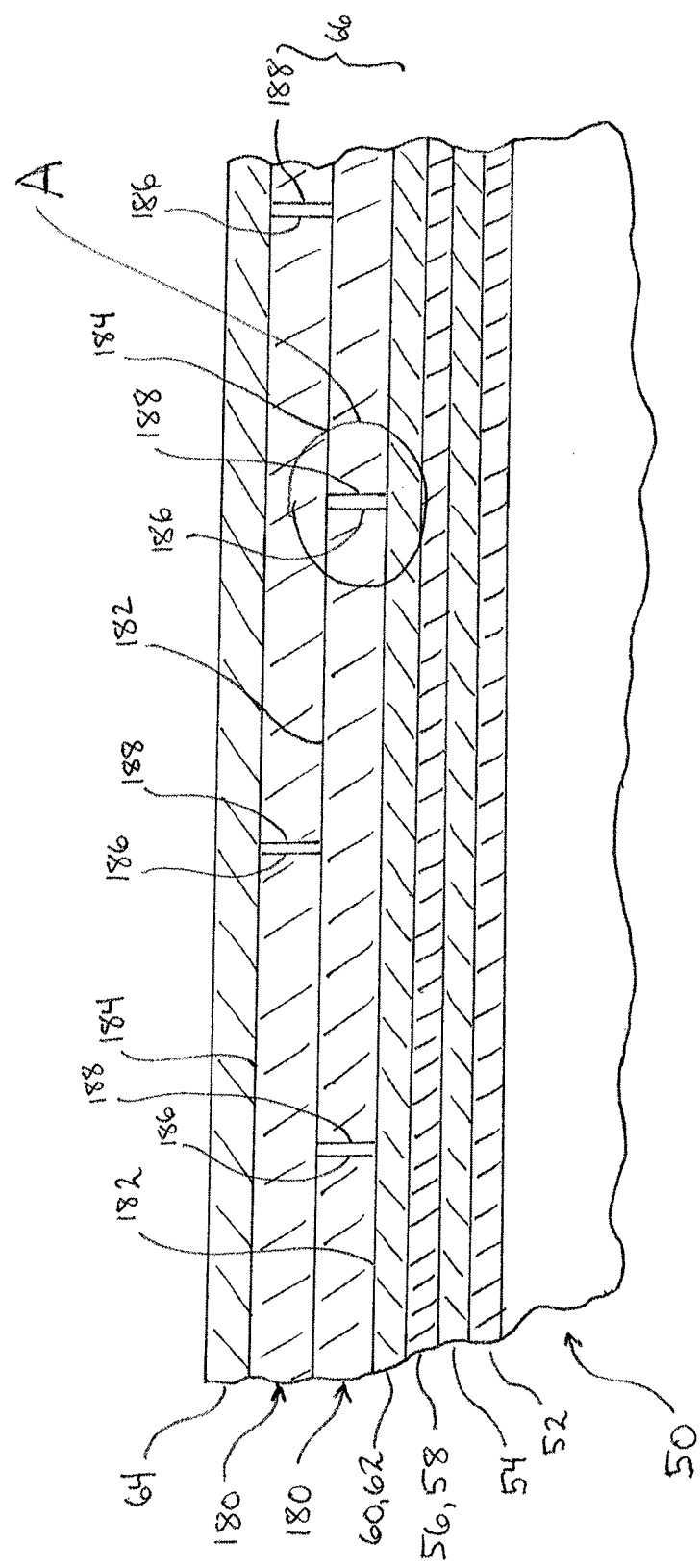

It is not necessary that the insulating tapes overlap or interlock in all embodiments of the invention. In this regard, the insulating tapes described below and illustrated in FIGS. 9 to 11 are non-interlocking, non-overlapping tapes of approximately rectangular cross-section. In order to provide flexible pipe 50 with a continuous insulating layer 66 of sufficient thickness, the tapes of FIGS. 9 to 11 may be applied in two or more layers, with the gaps of adjacent layers being staggered. As mentioned above, the number of layers depends at least partly on the desired thickness of insulation layer 66 and on the thickness of the thermal insulation tapes described below.

FIG. 9 illustrates a pipe 50 having a thermal insulation layer 66 located between the tensile armour layers 60, 62 and the outer sheath 64. The thermal insulation layer is comprised of an insulating tape 180 with a simple rectangular cross-section, comprising a flat planar portion with a first major surface 182, a second major surface 184 and a pair of vertical side surfaces 186, 188, the first major surface 182 facing inwardly toward the centre of the pipe 50 and the second major surface 184 facing outwardly toward sheath 64. The tape 180 is applied to the pipe 50 with a gap (for example about 3 mm) being provided between the side surfaces 186, 188 of adjacent windings in each layer. As mentioned above, the pipe 50 may be provided with two or more layers of tape 180 so as to provide the pipe 50 with a continuous insulation layer 66, with the gaps in adjacent layers being staggered, for example by about 50 percent.

FIGS. 10 and 11 illustrate variants of the rectangular insulating tape 180 of FIG. 9. The portions of pipe 50 shown in FIGS. 10 and 11 are restricted to enlarged areas A' and A", which are identical to area A of FIG. 9 except for the variations in the insulation tapes described below. In other words, the insulation tapes of FIGS. 10 and 11 are intended to be applied to pipe 50 in the same manner as tape 180 of FIG. 9.

FIG. 10 illustrates insulation tape 190 having first and second major surfaces 192, 194 and side surfaces 196, 198, and being identical to the tape 180 of FIG. 10 except that side surfaces 196, 198 are continuously curved between the major surfaces 192, 194. The tape 200 of FIG. 11 is similar, having first and second major surfaces 202, 204 and side surfaces 206, 208, and being identical to the tape 190 of FIG. 10 except that only the transitions between major surfaces 202, 204 and side surfaces 206, 208 are rounded, and the side surfaces 206, 208 have vertical portions located midway between the major surfaces 202, 204. As with tape 180, a flexible pipe may be provided with two or more layers of tape 190 or 200 so as to provide the pipe with a continuous layer of insulation, with the gaps in adjacent layers being staggered, for example by about 50 percent.

Although three variants of rectangular insulating tapes are illustrated in the drawings, it will be appreciated that other variants are possible within the scope of the present invention. For example, a variant of FIGS. 10 and 11 could be provided in which the transitions between the major surfaces and the side surfaces are smoothly rounded as in FIG. 11, and wherein the side surfaces are smoothly rounded as in FIG. 10.

Although pipe 50 is not shown in detail in FIGS. 2 to 11, it will be appreciated that the thermal insulation tapes illustrated in FIGS. 2 to 11 may be applied to a "rough bore" pipe 50 having the same construction shown in FIG. 1, or may be applied to flexible pipes having alternate structures, including the "smooth bore" pipes described above.

The thermal insulation tapes according to the present invention may exhibit all the following properties at the average operating temperature of the pipe:
high compressive triaxial creep resistance of 0-10% compression after 20 years at 60 degrees C. under a load of about 5-15 MPa,
high uniaxial compressive strength (>25 MPa),
low thermal conductivity ($\leq$0.170 W/mK),
high specific heat capacity (>1000 J/kgK),
long term temperature withstand capability (up to 100° C.),
adequate ductility (>10% elongation at break)

The thermal insulation layers according to the present invention are prepared from polystyrene or styrene-based thermoplastics, including polystyrene homopolymer, polystyrene copolymer, high-impact polystyrene, and modified polystyrene. The modified polystyrene comprises polystyrene which is blended, grafted or copolymerized with butadiene, polybutadiene, polyethylene, polypropylene, polybutene-1, polyphenylene oxide, styrene-butadiene, styrene-butadiene-styrene, styrene-isoprene-styrene, styrene-ethylene/butylene-styrene, ethylene-propylene, acrylonitrile, butadiene-acrylonitrile, α-methyl styrene, acrylic ester, methyl methacrylate, polycarbonate, or polyphenylene ether.

Thermal insulation compositions prepared from these materials may also contain additives selected from one or more members of the group comprising inorganic fillers, reinforcing fillers, nano-fillers, conductive fillers, flame-retardant fillers, antioxidants, heat-stabilisers, process aids, compatibilisers, and colourants.

Foaming Agents

Foamed thermal insulation layers in the insulating and protective coatings according to the invention can be prepared from the aforementioned polystyrene or styrene-based thermoplastics, by incorporating chemical foaming agents, by the physical injection of gas or volatile liquid, or by blending with hollow polymer, glass or ceramic microspheres.

The chemical foaming agents may function through either an endothermic (heat absorbing) or exothermic (heat generating) reaction mechanism, and are selected from one or more members of the group comprising sodium bicarbonate, citric acid, tartaric acid, azodicarbonamide, 4,4-oxybis (benzene sulphonyl)hydrazide, 5-phenyl tetrazole, dinitrosopentamethylene tetramine, p-toluene sulphonyl semicarbazide, or blends thereof. Preferably the chemical foaming agent is an endothermic foaming agent, such as sodium bicarbonate blended with citric or tartaric acid.

Chemical foaming occurs when the foaming agent generates a gas, usually $CO_2$ or $N_2$, through decomposition when heated to a specific temperature. The initial decomposition temperature along with gas volume, release rate and solubility are important parameters when choosing a chemical foaming agent and they need to be carefully matched to the processing temperature of the particular thermoplastic being foamed.

The gas or volatile liquid used for physical injection is selected from the group comprising $CO_2$, supercritical $CO_2$, $N_2$, air, helium, argon, aliphatic hydrocarbons, such as butanes, pentanes, hexanes and heptanes, chlorinated hydrocarbons, such as dichloromethane and trichloroethylene, and hydrochlorofluorocarbons, such as dichlorotrifluoroethane. In the case of a volatile liquid, foaming occurs when the heated liquid vaporizes into gas. Preferably the physical foaming agent is supercritical $CO_2$.

The hollow microspheres are selected from one or more members of the group comprising glass, polymeric, or ceramic, including silica and alumina, microspheres. Preferably the hollow microspheres are lime-borosilicate glass microspheres. Foamed thermal insulation layers incorporating hollow microspheres are also referred to herein as "syntactic" foams.

Extrusion of Thermal Insulation

Extrusion may be accomplished using single screw extrusion, either in single or tandem configuration, or by twin-screw extrusion methods. When extruding foamed insulation it is important that foaming be prevented until the polymer exits the extrusion die.

The insulation may be extruded as a single strip or as a sheet that is subsequently slit into individual strips.

In the case of single screw extrusion, the extruder screw may be either a single stage or a 2-stage design. A single stage would be adequate for chemical foam extrusion whereby the foaming agent is added as a pelleted concentrate or masterbatch which is pre-mixed with the polymer to be foamed using a multi-component blender, for example, mounted over the main feed port of the extruder. In the 2-stage screw design, the first and second stages are separated by a decompression zone, at which point a gas or liquid physical foaming agent can be introduced into the polymer melt via an injection or feed port in the extruder barrel. The first stage acts to melt and homogenize the polymer, whereas the second stage acts to disperse the foaming agent, cool the melt temperature, and increase the melt pressure prior to the melt exiting the die. This may also be accomplished by tandem extrusion, wherein the two stages are effectively individual single screw extruders, the first feeding into the second. The design of the screw is important and it may incorporate barrier flights and mixing elements to ensure effective melting, mixing, and conveying of the polymer and foaming agent.

With respect to the particular foam insulations described herein, it is important that conditions of mixing, temperature and pressure are adjusted to provide a uniform foam structure comprising small or microcellular bubbles with a narrow size distribution evenly distributed within the polymer matrix in order to ensure maximum compressive strength and compressive creep resistance of the insulation when subjected to high external pressures.

Twin screw extrusion is preferred where the polymer to be foamed is shear sensitive or if it is required that fillers or other additives be incorporated into the foam composition. It is recommended for preparation of syntactic foams or foams prepared by physical injection of a gas or liquid foaming agent. Since the twin screw design is usually modular, comprising several separate and interchangeable screw elements, such as mixing and conveying elements, it offers great versatility in tailoring the screw profile for optimum mixing and melt processing. In the case of syntactic foams, for example, the hollow microspheres are fed directly into the polymer melt using a secondary twin-screw feeder downstream of the main feed hopper. Additionally, a static mixing attachment or gear pump may be inserted between the end of the screw and the die to further homogenize the melt, generate melt pressure, and minimize melt flow fluctuations.

For a foamed thermal insulation, the degree of foaming is dependant upon the required balance of thermal conductivity and compressive strength. Too high a degree of foaming may be detrimental to the compressive strength and creep resistance of the foam. The thermoplastic foams of the present invention are typically foamed from about 5% to about 50%, more preferably from about 10% to about 30%. The degree of foaming is defined herein as the degree of rarefaction, i.e. the decrease in density, and is defined as $[(D_{matrix}-D_{foam})/D_{matrix}] \times 100$. Expressed in this way, the degree of foaming reflects the volume percentage of gas under the assumption that the molecular weight of gas is negligible compared to that of the matrix, which is generally true. In the alternative, the degree of foaming can be measured visually by microscopic determination of cell density.

EXAMPLES

The present invention is illustrated by way of the following examples and with reference to the drawings.

Example 1

An insulating tape with a rectangular cross-section of width 50+/−2.5 mm and thickness 5+/−0.4 mm was extruded from unfoamed high impact polystyrene (Melt Flow Rate, 3.5 g/10 min and Density, 1030 kg/m³) at a melt temperature of 200 degrees C. The tape thus produced was tested for the properties in Table 1.

Example 2

An insulating tape with a rectangular cross-section of width 50+/−2.5 mm and thickness 10+/−0.4 mm was extruded from the high impact polystyrene of Example 1 foamed to a density of 850 kg/m³ using 0.8% of an endothermic foaming agent. The tape thus produced was tested for the properties in Table 1.

Example 3

An insulating tape with a rectangular cross-section of width 50+/−2.5 mm and thickness 10+/−0.4 mm was extruded from the unfoamed high impact polystyrene of Example 1 modified with 20% styrene-butadiene-styrene block copolymer (Melt Flow Rate, 13 g/10 min and Density, 1000 kg/m3). The tape thus produced was tested for the properties in Table 1.

One or more layers of the insulation tapes produced in Examples 1 to 3 were helically wound around the internal armoured cores of flexible pipes as described earlier to provide an insulation layer as per product design requirements.

TABLE 1

| | Insulation Properties | | | |
|---|---|---|---|---|
| PROPERTY | TEST METHOD | EXAMPLE 1 | EXAMPLE 2 | EXAMPLE 3 |
| Density, kg/m³ | ASTM D792 | 1030 | 850 | 1020 |
| Degree of Foaming, % | Calculated as above | 0 | 17.5 | 0 |
| Thermal conductivity, W/mK (single layer) | ASTM C177 | 0.155 +/− 5% | 0.130 +/− 5% | 0.170 +/− 5% |
| Specific Heat Capacity, J/kgK | ASTM E1269 | 1150 +/− 5% | 1150 +/− 5% | 1150 +/− 5% |
| Vicat Softening Point B/50, ° C. | ASTM D1525 | 105 +/− 5 | 105 +/− 5 | 80 +/− 5 |
| Tensile Strength at Yield, MPa | ASTM D638 | 14 +/− 0.5 | 9 +/− 0.3 | 13 +/− 0.5 |
| Elongation at Yield, % | ASTM D638 | 2 +/− 0.5 | 4 +/− 0.5 | 5 +/− 0.5 |
| Elongation at Break, % | ASTM D638 | 30 +/− 5 | 20 +/− 2 | 75 +/− 10 |
| Flexural Modulus, MPa | ASTM D638 | 2300 +/− 200 | 900 +/− 100 | 800 +/− 100 |
| Triaxial Compressive Creep, % after 20 years at 60° C. and 5 MPa | InSpec 1-1-4-140/SP01 | <1.0 | <1.5 | <1.0 |
| Water Absorption Saturated, 23° C., % | ASTM D570 | <0.1 | <0.1 | <0.1 |

Although the wrappable styrenic pipe insulations disclosed herein may be applied between the armour layers and the outer sheath of a flexible fluid and/or gas transport conduit, it will be appreciated that the wrappable styrenic pipe insulations disclosed herein may instead or additionally be applied at other locations within the layered structure of a flexible fluid and/or gas transport conduit. For example, the wrappable styrenic pipe insulations disclosed herein may be applied between the inner liner 54 and the layers of flexible pressure armour 56, 58 in the flexible pipe structure 50 described above.

Although the invention has been described in connection with certain embodiments thereof, it is not limited thereto. Rather, the invention includes all embodiments which may fall within the scope of the following claims.

What is claimed is:

1. A wrappable, styrenic thermal insulation product for application to a flexible, armoured pipe, comprising:
    an elongate tape comprising a flat, planar portion of generally rectangular cross-section and having a first major surface, an opposed second major surface, and a pair of opposed side surfaces extending between the first and second major surfaces, a width and a thickness, wherein the width of the flat, planar portion is greater than the thickness;
    wherein the tape is comprised of polystyrene or a styrene-based thermoplastic and has the following properties:
    triaxial compressive creep resistance of 0-10% compression after 20 years at 60 degrees C. under a load of about 5-15 MPa;
    uniaxial compressive strength >25 MPa; and
    thermal conductivity ≦0.170 W/mK.

2. The wrappable, styrenic thermal insulation product of claim 1, wherein the side surfaces are substantially straight, and are oriented at substantially right angles to the first and major surfaces.

3. The wrappable, styrenic thermal insulation product of claim 1, wherein the side surfaces are continuously rounded between the first and second major surfaces.

4. The wrappable, styrenic thermal insulation product of claim 1, wherein the flat planar portion is provided with rounded edges at corners between the side surfaces and the first and second major surfaces, and wherein the side surfaces include straight portions extending between said rounded edges.

5. The wrappable, styrenic thermal insulation product of claim 1, further comprising at least one overlapping portion connected to the flat, planar portion and extending therefrom, wherein the overlapping portion is adapted to engage an adjacent winding of said thermal insulation tape, after it is wound around said pipe.

6. The wrappable, styrenic thermal insulation product of claim 5, wherein the tape has one said overlapping portion extending from one of said side surfaces in a direction which is generally parallel to at least one of said first and second major surfaces;
    wherein the overlapping portion is adapted to engage a part of the flat planar portion of an adjacent winding of said thermal insulation tape, after it is wound around said pipe; and
    wherein at least one of the overlapping portion and the part of the flat planar portion which is adapted to be engaged by the overlapping portion, are of a reduced thickness relative to a maximum thickness of the flat planar portion, such that the thickness of the thermal insulation product, after it is wound around the pipe, is substantially the same as the maximum thickness of the flat planar portion of the tape.

7. The wrappable, styrenic thermal insulation product of claim 6, wherein the tape comprises two of said overlapping portions, extending in opposite directions from said side surfaces and being generally parallel to at least one of said first and second major surfaces;
    wherein a first one of said overlapping portions is adapted to engage a second one of said overlapping portions of an adjacent winding of said thermal insulation tape, after it is wound around said pipe; and
    wherein at least one of the first and second overlapping portions has a reduced thickness relative to a maximum thickness of the flat planar portion, such that the thickness of the thermal insulation product, after it is wound around the pipe, is substantially the same as the maximum thickness of the flat planar portion of the tape.

8. The wrappable, styrenic thermal insulation product of claim 5, wherein each of the at least one overlapping portion has a cross-sectional shape selected from rectangular and triangular.

9. The wrappable, styrenic thermal insulation product of claim 5, wherein each of the at least one overlapping portion is provided with an interlocking portion which is adapted to interlock with an interlocking portion in an adjacent winding of said thermal insulation tape, after it is wound around said pipe.

10. The wrappable, styrenic thermal insulation product of claim 1, further comprising at least one interlocking portion connected to the flat, planar portion and protruding at an angle to the first and second major surfaces, wherein the at least one interlocking portion is adapted to interlock with an interlocking portion in an adjacent winding of said thermal insulation tape, after it is wound around said pipe.

11. The wrappable, styrenic thermal insulation product of claim 10, wherein each of the interlocking portions protrudes from either the first or second major surface of the flat, planar portion.

12. The wrappable, styrenic thermal insulation product of claim 10, wherein the elongate band has two of said interlocking portions, both of which protrude from the first major surface of the flat, planar portion.

13. The wrappable, styrenic thermal insulation product of claim 10, wherein the elongate tape defines a longitudinal axis, wherein the elongate tape has a pair of edge portions extending along said longitudinal axis, and wherein each of the interlocking portions is located in one of said edge portions.

14. The wrappable, styrenic thermal insulation product of claim 10, wherein each of the interlocking portions protrudes from either the first or second surface of the flat, planar portion at an angle of about 90 degrees.

15. The wrappable, styrenic thermal insulation product of claim 10, wherein the interlocking portions all have substantially the same height.

16. The wrappable, styrenic thermal insulation product of any claim 10, wherein the elongate tape has a pair of said interlocking portions and is U-shaped in transverse cross-section.

17. The wrappable, styrenic thermal insulation product of claim 10, wherein the elongate tape has two of said interlocking portions, one of which protrudes from the first major surface of the flat planar portion, and the other of which protrudes from the second major surface of the flat planar portion.

18. The wrappable, styrenic thermal insulation product of claim 10, wherein the elongate tape has a pair of said interlocking portions and is S-shaped or Z-shaped in transverse cross-section.

19. The wrappable, styrenic thermal insulation product of claim 10, wherein the elongate tape defines a longitudinal axis, wherein the elongate tape has a pair of edge portions extending along said longitudinal axis, and wherein the elongate tape has one of said interlocking portions located approximately midway between said edge portions.

20. The wrappable, styrenic thermal insulation product of claim 19, wherein said one interlocking portion extends from said flat planar portion at an angle of about 90 degrees such that the elongate tape is T-shaped in transverse cross-section.

21. The wrappable, styrenic thermal insulation product of claim 1, wherein the polystyrene or styrene-based thermoplastic is selected from one or more members of the group consisting of: polystyrene homopolymer, polystyrene copolymer, high-impact polystyrene and modified polystyrene.

22. The wrappable, styrenic thermal insulation product of claim 21, wherein the modified polystyrene comprises polystyrene which is blended, grafted or copolymerized with butadiene, polybutadiene, polyethylene, polypropylene, polybutene-1, polyphenylene oxide, styrene-butadiene, styrene-butadiene-styrene, styrene-isoprene-styrene, styrene-ethylene/butylene-styrene, ethylene-propylene, acrylonitrile, butadiene-acrylonitrile, α-methyl styrene, acrylic ester, methyl methacrylate, polycarbonate, or polyphenylene ether.

23. The wrappable, styrenic thermal insulation product of claim 1, wherein the polystyrene or styrene-based thermoplastic is unfoamed.

24. The wrappable, styrenic thermal insulation product of claim 1, wherein the polystyrene or styrene-based thermoplastic is foamed and contains gas bubbles and/or hollow micro-spheres, and wherein a degree of foaming is about 5-50 percent.

25. The wrappable, styrenic thermal insulation product of claim 1, wherein the elongate tape has a core layer which is foamed and a surface layer surrounding the core layer, wherein the surface layer is unfoamed.

26. The wrappable, styrenic thermal insulation product of claim 1, having a density in the range from about 700-1050 kg/m$^3$.

27. The wrappable, styrenic thermal insulation product of claim 26, having a density in the range from about 850-1030 kg/m$^3$.

28. A flexible, armoured pipe comprising a flexible, cylindrical metal carcass surrounded by at least one layer of flexible metal armour;
   wherein the pipe further comprises a layer of thermal insulation surrounding the armour;
   wherein the layer of thermal insulation is comprised of one or more layers of the wrappable, styrenic thermal insulation product of claim 1, and wherein each layer of the tape is comprised of a plurality of windings arranged adjacent to one another;
   wherein the thermal insulation tape is comprised of a thermoplastic material, and comprises a flat, planar portion which is substantially parallel to an axis defined by the carcass and the armour.

29. The flexible, armoured pipe of claim 28, wherein the pipe further comprises an external, polymeric sheath provided over the armour, and wherein the at least one layer of thermal insulation is located between the armour and the external, polymeric sheath.

* * * * *